United States Patent

Yamazaki et al.

[11] 4,073,271
[45] Feb. 14, 1978

[54] TORCH IGNITION TYPE INTERNAL COMBUSTION ENGINE

[75] Inventors: Masafumi Yamazaki, Yokohama; Yasuhiko Nakagawa, Kamakura, both of Japan

[73] Assignee: Nissan Motor Company, Limited, Japan

[21] Appl. No.: 685,451

[22] Filed: May 12, 1976

[30] Foreign Application Priority Data

May 13, 1975 Japan .................................. 50-57824

[51] Int. Cl.² .............................................. F02B 19/10
[52] U.S. Cl. .............................. 123/75 B; 123/52 M; 123/191 S
[58] Field of Search ............. 123/32 ST, 32 SP, 75 B, 123/143 B, 191 S, 191 SP, 33 D, 52 M

[56] References Cited

U.S. PATENT DOCUMENTS

| | | | |
|---|---|---|---|
| 3,543,736 | 12/1970 | Suzuki et al. | 123/143 BX |
| 3,763,834 | 10/1973 | Geiger et al. | 123/32 SP |
| 3,830,205 | 8/1974 | Date et al. | 123/32 ST |
| 3,991,725 | 11/1976 | Nakagawa et al. | 123/32 ST X |

*Primary Examiner*—Charles J. Myhre
*Assistant Examiner*—Tony M. Argenbright

[57] ABSTRACT

A torch ignition type internal combustion engine has therein a main combustion chamber and an auxiliary combustion chamber which chambers are individually communicable with a common carburetor through a main intake valve and an auxiliary intake valve, respectively. The opening timing of the auxiliary intake valve is so controlled to be later than that of the main intake valve.

9 Claims, 3 Drawing Figures

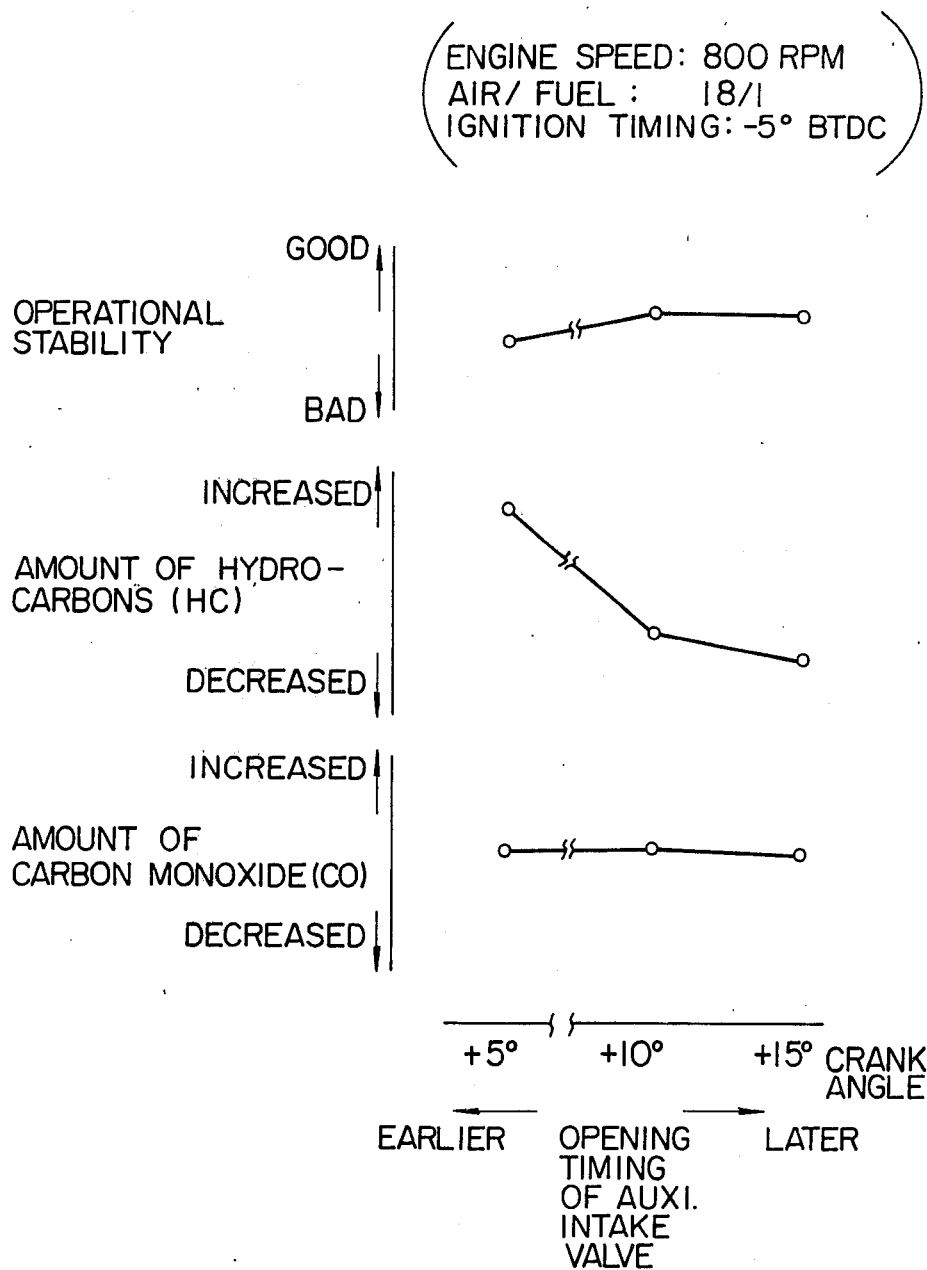

TORCH IGNITION TYPE INTERNAL COMBUSTION ENGINE

The present invention relates in general to a torch ignition type internal combustion engine having main and auxiliary combustion chambers which are respectively fed with lean air-fuel mixture and rich air-fuel mixture by a common air-fuel mixture supply means, and more particularly to an engine of this type in which respective intake valves of the main combustion chambers and the auxiliary combustion chambers are so controlled to have different opening timings for the purpose of reducing the amount of the toxic combustible compounds, issued from the engine, to a minimum.

It is an object of the present invention to provide a torch ignition type internal combustion engine which can minimize the concentration of toxic combustible compounds such as hydrocarbons (HC) and carbon monoxide (CO) in the exhaust gases issued therefrom without sacrificing the other performance characteristics thereof.

It is another object of the present invention to provide a torch ignition type internal combustion engine of this type in which the main and auxiliary combustion chambers formed in the engine proper are respectively fed with lean mixture and rich mixture by a common carburetor having two barrels.

It is still another object of the present invention to provide a torch ignition type internal combustion engine of the above-mentioned type in which the opening timing of the auxiliary intake valve associated with the auxiliary combustion chamber is so controlled to be later than that of the main intake valve associated with the main combustion chamber.

It is a further object of the present invention to provide a torch ignition type internal combustion engine of this type which has a camshaft mechanism arranged in such a manner that the valve lifting operation of a cam corresponding to the auxiliary intake valve starts after the operation of the other cam corresponding to the main intake valve takes place.

The features and advantages of the torch ignition type internal combustion engine according to the present invention will become apparent from the following detailed description when taken in conjunction with the accompanying drawings in which:

FIG. 3 is a graph illustrating the performance characteristic achieved by the engine of this invention.

Figure 1:
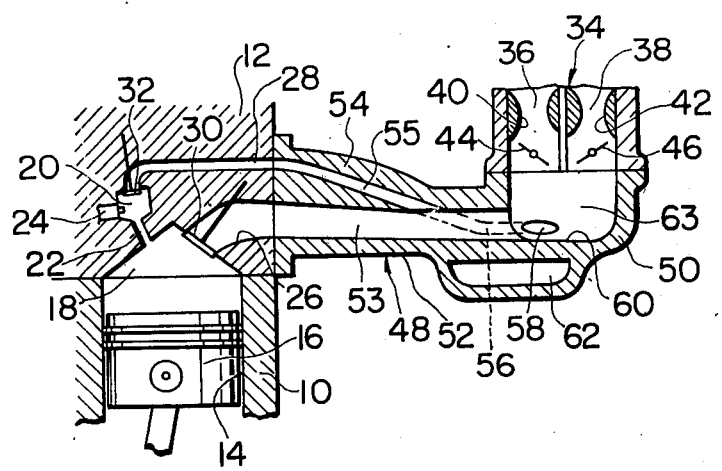
FIG. 1 is a schematic vertical sectional view showing a preferred embodiment of a torch ignition type internal combustion engine according to the principal of the present invention.
Figure 2:
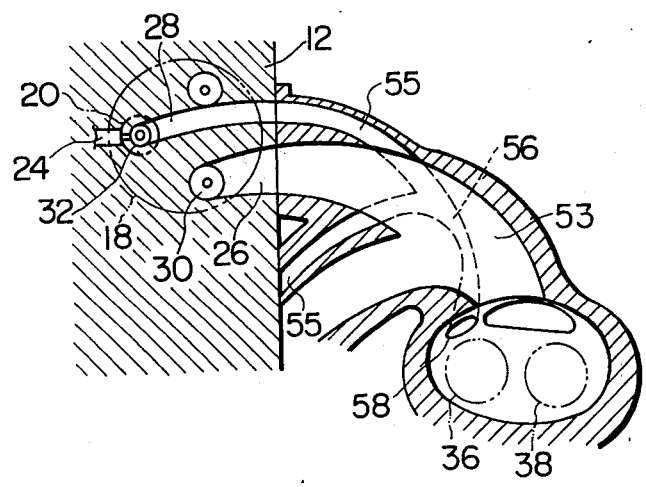
FIG. 2 is a cross sectional view of the engine illustrated in FIG. 1.

Referring now FIGS. 1 and 2 of the drawings, a multiple cylinder internal combustion engine comprises a cylinder block 10 and a cylinder head 12 located atop the cylinder block 10. The cylinder block 10 is formed with a series of cylinder 14 (only one of which is shown for simplicity of illustration) and a reciprocating piston 16 is movable up and down in each cylinder 14, as is well known. The cylinder head 12 is formed with a main combustion chamber 18 at the top of each cylinder 14 and an auxiliary combustion chamber 20 which is in constant communication with the main combustion chamber 18 through a calibrated torch passageway 22 also formed in the cylinder head 12. An ignition spark plug 24 projects into the auxiliary combustion chamber 20. The cylinder head 12 is further formed with main and auxiliary intake ports 26 and 28 leading across main and auxiliary intake valves 30 and 32 to the main and auxiliary combustion chambers 18 and 20, respectively, of each engine cylinder 14. A carburetor 34, only part of which is shown, has primary and secondary barrels 36 and 38 which barrels have repective venturi portions 40 and 42 and respective throttle valves 44 and 46 located downstream of the venturi portions 40 and 42, respectively. As is well known, the primary barrel 36 is responsive for delivery of air-fuel mixture under most operating conditions of the engine, while the secondary barrel 38 is adapted to be brought into operation for full engine power. The carburetor 34 constructed and arranged in this manner is connected to the cylinder head 12 through an intake manifold 48. The intake manifold 48 consists of a main tube portion 50 located below the carburetor 34 and main and auxiliary runner portions 52 and 54 which are shown cast into an integral structure. The main tube portion 50 has a bottom wall 60 having an inner or upper surface substantially flush with the bottom surface of each of main passageways 53 formed in the main runner portion 52, the main passageways 53 leading from a plenum area 63 in the main tube portion 50 to the main intake ports 26 in the cylinder head 12 as shown. The bottom wall 60 forms part of the manifold floor which is substantially flat in the embodiment illustrated in the drawings. The auxiliary runner portions 54 are formed with auxiliary passageways 55 branched from a parent passageway 56 which is open into the plenum area 63 of the main tube portion 50 through an opening 58 formed in the bottom wall 60, as shown. The auxiliary passageways 55 are respectively in communication with the auxiliary intake ports 28 formed in the cylinder head 12. Constant communication is thus provided between each of the auxiliary intake ports 28 and the plenum area 63 in the main tube portion 50 of the intake manifold 48 through the opening 58 in the bottom wall 60, the parent passageway 56 and each of the auxiliary passageways 55 of the auxiliary runner portions 54. This communication is extended to each of the auxiliary combustion chambers 20 when the auxiliary intake valve 32 associated with the auxiliary combustion chamber 20 is open during intake stroke of the engine cylinder 14. A heat transfer chamber 62 is positioned directly under the manifold floor and has a portion located below the bottom wall 60 of the main tube portion 50. The heat transfer chamber 62 is in communication with a source of fluid heated by the heat developed as a result of the operation of the engine so that the hot fluid circulated through the heat transfer chamber 62 preheats the mixture being passed through the plenum area 63 in the main tube portion 50 and the main passageways 53 in the main runner portion 52. The heat transfer chamber 62 may be arranged similarly to the usual manifold crossover chamber communicating with the exhaust manifold (not shown) of the engine or, as an alternative, may be in communication with the water jackets (not shown) formed in the cylinder block 10.

Referring again to the carburetor 34, the carburetor 34 is of a down-draft type in which the primary and secondary barrels 36 and 38 are arranged in such a manner as to deliver a relatively lean air-fuel mixture (for example, the air-fuel ratio within the range of from about 15:1 to about 30:1). Now, in this instance, the travelling of the air-fuel mixture from the carburetor 34 toward the main and auxiliary combustion chambers 18 and 20 is as follows:

First, the mixture is distributed through the plenum area 63 in the main tube portion 50 of the intake manifold 48 partly into the main passageways 53 in the main runner portions 52 and partly into the auxiliary passageways 55 through the opening 58. The mixture in each main passageways 53 is drawn through each of the main intake ports 26 into the associated main combustion chamber 18 during intake stroke of the engine cylinder 14 when the intake valve 30 is open. While the air-fuel mixture is flowing through the plenum area 63 in the main tube portion 50 of the intake manifold 48, liquid fuel drops out of the mixture and spreads in a thin layer over the surface of the manifold floor. The film of the liquid fuel is in part evaporated by the heat transferred to the manifold floor from the heat transfer chamber 62 in contact with the underside of the manifold floor and in part sucked into the parent passageway 56 through the opening 58 in the bottom wall 60 of the main tube portion 50. The liquid fuel thus admitted to the parent passageway 56 is evaporated by the heat transferred thereto from the heat transfer chamber 62 through the bottom wall 60 and is admixed to the relatively lean air-fuel mixture which has been admitted into the parent passageway 56 from the plenum area 63 in the main tube portion 50. The enriched air-fuel mixture is passed through each of the auxiliary passageways 55 and each of the auxiliary intake ports 28 into each of the auxiliary combustion chambers 20 in the cylinder head 12 during the intake stroke of the associated engine cylinder 14 when the intake valve 32 is open.

The opening 58 at the intake of the passageway 56 may be located anywhere in the bottom wall 60 of the main tube portion 50 of the intake manifold 48. Where the intake manifold 48 is provided in combination with the two-barrel carburetor as in the arrangement herein shown, however, it is preferable that the opening 58 be located below the primary barrel 36 of the carburetor 34 as shown so that the mixture supplied to the auxiliary combustion chambers 20 can be enriched not only when both of the primary and secondary barrels 36 and 38 are in operation by also during low-load or idling operation of the engine when only the primary barrel 36 is in play.

With the above-stated torch ignition type internal combustion engine, several experiments have been made on the performance characteristics of this engine with a result that if the opening timing of each auxiliary intake valve 32 is set earlier than that of the associated main intake valve 30, not only the operational stability of the engine is lowered but also the amounts of the toxic combustible compounds, especially of hydrocarbons (HC), issued from the engine are considerably increased. Further, this phenomenon has become more noticeable during the idling operation of the engine.

These phenomena are due to the fact that, especially in the idling operation of the engine, relatively large amounts of combusted gases are caused to stay in the main combustion chamber and the pressure in the passageways of the intake manifold is lower than that in the main combustion chamber, thus in the initial state of the intake stroke of each cylinder, a considerable amount of resident combusted gases is subjected to backward flow toward the passageways of the intake manifold. Accordingly, if the opening timing of the auxiliary intake valve is set earlier that of the main intake valve, the above stated backward flow is made, in the initial state of the intake stroke, mainly in the auxiliary passages connecting the auxiliary combustion chambers with the carburetor thereby preventing the rich mixture in the auxiliary passages from feeding into the auxiliary combustion chamber 20. By the backward flow of the resident combusted gases toward the opening 58, the air-fuel mixture in the plenum area of the main tube portion 50 tends to feed into the main passageways 53 in large amounts. Accordingly, the preferable and stable rich air-fuel mixture supply is not achieved in the auxiliary combustion chamber 20 thus resulting in failure of generating a mighty torch in the torch passageway 22, so that the complete and stable combustion of the lean air-fuel mixture is not provided in the main combustion chamber 18.

In order to solve the drawbacks mentioned above, the following procedure is further requested in this invention, that is, the opening timing of the auxiliary intake valve 32 is controlled later than that of the main intake valve 30. For this purpose, it is preferable to arrange a camshaft mechanism of the engine in such a manner that an auxiliary cam mounted on a camshaft starts to lift the associated auxiliary intake valve 32 considerably after a main cam also mounted on the camshaft lifts the associated main intake valve 30. Of course, instead of the above-mentioned way, other ways are possible to provide such opening timing gap between the main and auxiliary intake valves, which are well known in the art.

By applying the simple way upon the above-stated torch ignition type internal combustion engine of the present invention, the following merits and advantages are achieved.

The backward flow of the combusted gases in the main combustion chamber toward the carburetor 34 (which flow is usually found in an initial state of the intake stroke of the associated engine cylinder 14) is occurred mainly in the main passageway 53 of the main runner portion 52 through the main intake valve 30 and the main intake port 26 without affecting the condition of the rich mixture in the auxiliary intake port 28 and the auxiliary passageway 55. Accordingly, the rich mixture supply into the auxiliary combustion chamber 20 is made so that the combustion of the rich mixture is readily made by the ignition of the spark plug 24 to generate a mighty torch for the complete combustion of the lean air-fuel mixture in the main combustion chamber 18. A stable engine operation is thus achieved in this instance while satisfying the reduction of the harmful combustible compounds such as hydrocarbons (HC) and carbon monoxide (CO) in the exhaust gases from the engine.

FIG. 3 is a graph graphically showing the performance characteristic of the engine according to the present invention, in which the operational stability of the engine, the amounts of the hydrocarbons (HC) and the carbon monoxide (CO) issued from the subjected engine are shown in accordance with the opening timing of the auxiliary intake valve 32. The opening timing of the auxiliary intake valve is represented, in this graph, by the crank angle of the cranshaft. As clearly shown in this graph, when the opening timing of the auxiliary intake valve is set to be later than that of the main intake valve, not only the operational stability of the engine is increased but also the hydrocarbons (HC) in the exhaust gases are considerably reduced. Furthermore, a slight reduction of the carbon monoxide (CO) is also found favorably.

Accordingly, by the above-stated torch type internal combustion engine according to the present invention, it becomes possible to keep the concentration of the air-fuel mixture fed into the auxiliary combustion chamber at constant state only by setting the opening timing of each of the auxiliary intake valves to be later than that of the associated main intake valve. Thus, in this instance, a stable and mighty torch is surely generated in the torch passageway so that complete combustion of the lean air-fuel mixture in the main combustion chamber is accomplished with results of drawing sufficient output of the engine and reducing the harmful compounds such as hydrocarbons (HO) and carbon monoxide (CO) issued from the engine.

Although, in the previous description, only one embodiment has been shown, it is to be understood that various changes and modifications may be made without departing from the scope of the invention by those skilled in the art, as defined in the appended claims.

What is claimed is:

1. A torch ignition type internal combustion engine having fluidly communicated main and auxiliary combustion chambers for each of the engine cylinders, said main and auxiliary combustion chambers being respectively provided with main and auxiliary intake valves, said engine comprising:
    a carburetor having a throttle valve;
    a cylinder head having therein main and auxiliary intake ports which are respectively and fluidly communicable with said main and auxiliary combustion chambers through the respective main and auxiliary intake valves;
    an intake manifold consisting of a main tube portion fluidly communicating with said carburetor downstream of said throttle valve, main runner portions branched from said main tube portion and formed with main passageways communicating upstream with said main tube portion and dowstream with said main intake ports respectively, and auxiliary runner portions formed with auxiliary passageways each providing fluid communication between each of the auxiliary combustion chambers and said main tube portion through an opening formed in said main tube portion; and
    valve actuating means for allowing each of said main intake valves to open earlier than the corresponding auxiliary intake valve during the engine operation.

2. A torch ignition type internal combustion engine as claimed in claim 1, in which said opening is formed in a portion in the vicinity of a bottom wall of said main tube portion.

3. A torch ignition type internal combustion engine as claimed in claim 2, further comprising heat transfer means contacting said bottom wall of said main tube portion and in communication with at least one source of heat developed as a result of the operation of said engine.

4. A torch ignition type internal combustion engine as claimed in claim 3, in which said heat transfer means comprises a heat transfer chamber formed underneath said bottom wall of the main tube portion.

5. A torch ignition type internal combustion engine as claimed in claim 4, in which said source of said heat is an exhaust manifold of said engine.

6. A torch ignition type internal combustion engine as claimed in claim 4, in which said source of heat is a cooling water jacket of said engine.

7. A torch ignition type internal combustion engine as claimed in claim 1, in which said carburetor is of a down-draft type having a lower end connected to said main tube portion of said intake manifold.

8. A torch ignition type internal combustion engine as claimed in claim 1, in which said carburetor is of a two-barrel type having primary and secondary barrels and in which said opening is located in alignment with said primary barrel.

9. Method for operating a torch type internal combustion engine including main and auxiliary combustion chambers for each of the engine cylinders, said main and auxiliary combustion chambers being respectively provided with main and auxiliary intake valves, a carburetor having a throttle valve, a cylinder head having therein main and auxiliary intake ports which are respectively and fluidly communicable with said main and auxiliary combustion chambers through the respective main and auxiliary intake valves, an intake manifold consisting of a main tube portion fluidly communicating with said carburetor downstream of said throttle valve, main runner portions branched from said main tube portion and formed with main passageways communicating upstream said main tube portion and downstream with said main intake ports respectively, and auxiliary runner portions formed with auxiliary passageways each providing fluid communication between each of the auxiliary combustion chambers and said main tube portion through an opening formed in a portion in said main tube portion, characterized in the step of opening said main intake valve before opening of said auxiliary intake valve.

* * * * *